United States Patent
Sawata

(10) Patent No.: US 11,293,907 B2
(45) Date of Patent: Apr. 5, 2022

(54) ELECTRIC CONDUCTIVITY DETECTOR AND ION CHROMATOGRAPH

(71) Applicant: Shimadzu Corporation, Kyoto (JP)

(72) Inventor: Hideto Sawata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 370 days.

(21) Appl. No.: 16/480,077

(22) PCT Filed: Feb. 20, 2017

(86) PCT No.: PCT/JP2017/006056
§ 371 (c)(1),
(2) Date: Jul. 23, 2019

(87) PCT Pub. No.: WO2018/150562
PCT Pub. Date: Aug. 23, 2018

(65) Prior Publication Data
US 2019/0369066 A1 Dec. 5, 2019

(51) Int. Cl.
*G01N 30/64* (2006.01)

(52) U.S. Cl.
CPC ....... *G01N 30/64* (2013.01); *G01N 2030/645* (2013.01)

(58) Field of Classification Search
None
See application file for complete search history.

(56) References Cited

U.S. PATENT DOCUMENTS

| | | | | |
|---|---|---|---|---|
| 4,672,322 A * | 6/1987 | Gratteau | | G01N 30/64 204/400 |
| 2010/0116016 A1 | 5/2010 | Bungo | | |
| 2014/0320146 A1 | 10/2014 | Sakamoto et al. | | |

FOREIGN PATENT DOCUMENTS

| | | |
|---|---|---|
| JP | S57-189052 A | 11/1982 |
| JP | H04-110760 A | 4/1992 |
| JP | H06-148155 A | 5/1994 |
| JP | H11-201957 A | 7/1999 |
| JP | 2002-214212 A | 7/2002 |
| JP | 3422017 B2 | 6/2003 |
| JP | 2005-009878 A | 1/2005 |
| JP | 2010-117214 A | 5/2010 |

(Continued)

OTHER PUBLICATIONS

Shimadzu Corporation. "CDD-6A Conductivity Detector Instruction Manual." pp. 1-27. Kyoto, Japan.

(Continued)

*Primary Examiner* — Daniel S Larkin
(74) *Attorney, Agent, or Firm* — Maier & Maier, PLLC

(57) ABSTRACT

An electric conductivity detector includes at least a cell part having a cell through which liquid flows therein and measurement electrodes measuring a current of liquid flowing through the liquid in the cell, a detection circuit electrically connected to the measurement electrodes and configured to detect a current value flowing between the measurement electrodes, and to output a signal based on the detected value, and a processing unit configured to take in a signal output from the detection circuit and perform signal processing, in which the cell part and the detection circuit are configured to be accommodated in a column oven regulating a temperature of an analytical column of an ion chromatograph.

4 Claims, 2 Drawing Sheets

(56) References Cited

FOREIGN PATENT DOCUMENTS

JP          2015-135251 A    7/2015
WO         2013/088834 A1    6/2013

OTHER PUBLICATIONS

"International Scientific Instruments Directory." Dec. 1987. pp. 83-84. North Institute for Scientific & Technical Information.
Chinese Office Action dated Oct. 12, 2020, in connection with corresponding CN Application No. 201780071323.1 (14 pp., including machine-generated English translation).
Translation of International Search Report and Written Opinion dated Apr. 18, 2017 of corresponding application No. PCT/JP2017/006056; 4 pages.
Taiwanese Office Action dated May 6, 2019 issued in corresponding application No. TW107104244; 4 pages.
Japanese Office Action dated May 12, 2020, in connection with corresponding JP Application No. 2019-500144 (6 pp., including machine-generated English translation).
Japanese Notice of Reasons for Cancellation dated Sep. 30, 2021, in connection with corresponding Japanese Application No. 2019-500144 (32 pp., including machine-generated English translation).

\* cited by examiner

ELECTRIC CONDUCTIVITY DETECTOR AND ION CHROMATOGRAPH

FIELD

The present invention relates to an electric conductivity detector having a cell through which liquid flows and detecting a sample component in the liquid flowing in the cell by measuring electric conductivity of the liquid flowing in the cell, and to an ion chromatograph including the electric conductivity detector.

BACKGROUND

In an ion chromatograph, an electric conductivity detector is generally used to detect a sample component separated in an analytical column (see Patent Document 1). The electric conductivity detector has a cell through which a mobile phase containing a sample component eluted from the analytical column flows, and electrodes arranged to sandwich the cell, and detects the sample component eluted from the analytical column by applying a voltage between the electrodes and measuring changes in current value flowing between the both electrodes.

Since electric conductivity as a target to be measured by such an electric conductivity detector is sensitive to a temperature change of a sample solution flowing through the cell, when the temperature of an environment around the cell changes, drift of a detection signal occurs accordingly and becomes a main cause of decrease in detection accuracy.

Patent Document 1: Japanese Patent Laid-open Publication No. 2002-214212

SUMMARY

As a countermeasure against the above-mentioned problem, there is also a method of accommodating a cell of an electric conductivity detector together with an analytical column in a column oven. By accommodating the cell in the column oven, the temperature of the cell is maintained constant, and occurrence of drift of a detection signal is suppressed. However, when it is attempted to further improve detection sensitivity of the electric conductivity detector, it was found that drift of a detection signal that affects measurement occurs when the temperature of the environment around the detector changes.

Accordingly, an object of the present invention is to suppress occurrence of drift of a detection signal that affects measurement regardless of detection sensitivity.

The present inventors have found that the causes of drift of a detection signal of the electric conductivity detector exist not only in temperature change of liquid flowing through the cell but also in temperature change of a detection circuit for current detection. Although influence of temperature change of the detection circuit on the detection signal is small compared to influence of temperature change of the cell, it was found that when it is attempted to improve detection sensitivity, a ratio of influence of such temperature change of the detection circuit becomes large and adversely affects measurement results. The present invention has been made based on such findings.

A first aspect of an electric conductivity detector according to the present invention includes at least a cell part having a cell through which liquid flows therein and measurement electrodes measuring a current of liquid flowing through the liquid in the cell, a detection circuit electrically connected to the measurement electrodes and configured to detect a current value flowing between the measurement electrodes, and to output a signal based on the detected value, and a processing unit configured to take in a signal output from the detection circuit and perform signal processing, in which the cell part and the detection circuit are configured to be accommodated in a column oven regulating a temperature of an analytical column of an ion chromatograph.

In the above-described electric conductivity detector, preferably, the cell part and the detection circuit are accommodated in a common casing to form an integral detection device. If the cell part and the detection circuit are integrated, handling when accommodating the cell part and the detection circuit in the column oven is easy.

The above-described detection device preferably includes a temperature sensor for detecting a temperature in the casing, and a heater whose output is controlled so that the temperature detected by the temperature sensor becomes a predetermined temperature. The temperature control of the cell part and the detection circuit can be performed with higher accuracy by that the detection device accommodated in the column oven with less temperature fluctuations independently performs temperature control.

In an analog circuit including a detection circuit configured to detect a current value and to output a signal based on the detected value, an amplifier circuit that amplifies the current value, and the like, an output signal of the analog circuit is likely to fluctuate due to temperatures. Therefore, it is preferable that a temperature of such an analog circuit be maintained constant. Accordingly, in the electric conductivity detector of the present invention, preferably, the detection circuit includes at least an analog circuit for detecting a magnitude of a current flowing between the measurement electrodes. With this configuration, a temperature of the analog circuit can be maintained constant, and an output signal from the analog circuit can be prevented from being affected by a temperature change of the surrounding environment.

Furthermore, preferably, the above detection circuit also includes an A/D conversion circuit configured to convert an analog signal output from the analog circuit into a digital signal and to output the digital signal to a processing unit. With this configuration, since the A/D conversion circuit is also accommodated in the column oven and the temperature is maintained constant, the output value from the A/D conversion circuit can be prevented from being affected by a temperature change of the surrounding environment.

A second aspect of the electric conductivity detector according to the present invention includes at least a cell part having a cell through which liquid flows therein and a pair of measurement electrodes measuring a current flowing through the liquid in the cell, a detection circuit electrically connected to the measurement electrodes and configured to detect a current value flowing between the measurement electrodes, and to output a signal based on the detected value, and a processing unit configured to take in a signal output from the detection circuit and perform signal processing, in which the cell part and the detection circuit are accommodated in a common casing to form an integral detection device, and the detection device includes a temperature sensor that detects a temperature in the casing, and a heater whose output is controlled so that a temperature detected by the temperature sensor becomes a predetermined temperature.

While the first aspect of the electric conductivity detector according to the present invention presupposes that the detection circuit is accommodated in the column oven together with the cell part, the second aspect described above is different in not presupposing that the detection circuit is accommodated in the column oven together with the cell part. In this second aspect, the detection device itself, which is configured by accommodating the cell part and the detection circuit in a common casing, independently has a temperature control function, thereby suppressing temperature fluctuations in the detection circuit and suppressing drift of detection signals.

An ion chromatograph according to the present invention includes an analysis flow passage, a liquid sending device for sending a mobile phase in the analysis flow passage, a sample injection part that injects a sample into the analysis flow passage, an analytical column for separating the sample injected by the sample injection part into individual components on a downstream of the sample injection part on the analysis flow passage, the electric conductivity detector described above for detecting ionic sample components separated by the analytical column by measuring the electric conductivity of an eluate from the analytical column on a downstream of the analytical column on the analysis flow passage, and the column oven accommodating the analytical column therein and configured to regulate the temperature of the analytical column to a set temperature.

In a first aspect of an electric conductivity detector according to the present invention, a detection circuit configured to detect a current value flowing between measurement electrodes and to output a signal based on the detected value is configured to be accommodated in a column oven together with a cell part. Thus, temperatures of the cell part and the detection circuit are maintained constant, and an output signal from the detection circuit is less susceptible to temperature changes of the surrounding environment of the electric conductivity detector. Consequently, electric conductivity drift can be suppressed, and even when it is necessary to detect with high sensitivity, measurement can be performed with high accuracy.

In a second embodiment of an electric conductivity detector according to the present invention, the cell part and the detection circuit are accommodated in a common casing to form an integral detection device, and the detection device independently includes a temperature sensor and a heater. Thus, temperatures of the cell part and the detection circuit are maintained constant, and an output signal from the detection circuit is less susceptible to temperature changes of the surrounding environment of the electric conductivity detector. Consequently, electric conductivity drift can be suppressed, and even when it is necessary to detect with high sensitivity, measurement can be performed with high accuracy.

An ion chromatograph of the present invention uses the above-described electric conductivity detector. Thus, drift is difficult to occur in a detection signal of the electric conductivity detector, and high sensitivity analysis can be performed with high accuracy.

DETAILED DESCRIPTION

Figure 1:
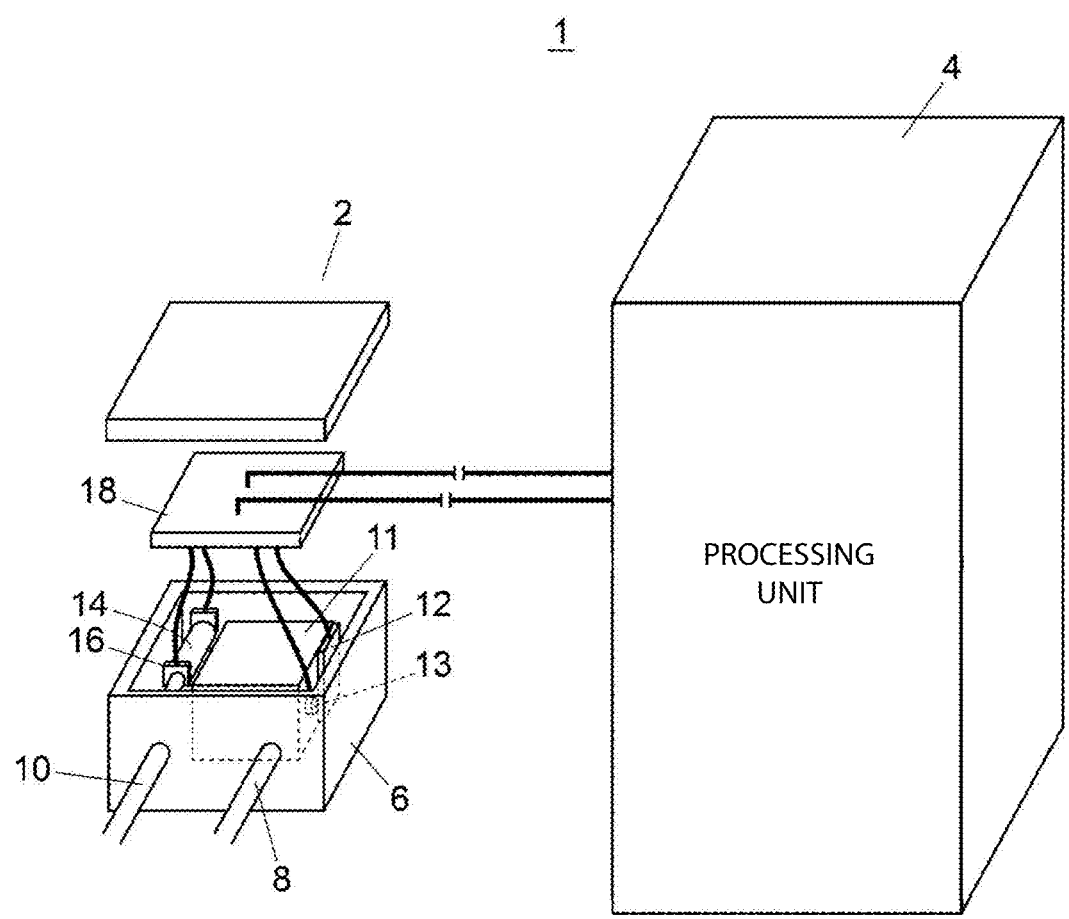
FIG. 1 is a partially exploded perspective view schematically illustrating an embodiment of an electric conductivity detector.

Hereinafter, embodiments of an electric conductivity detector and an ion chromatograph according to the present invention will be described with reference to the drawings.

A configuration of the electric conductivity detector of an embodiment will be described with reference to FIG. 1. In addition, in FIG. 1, in order to illustrate an internal structure of a detection device 2, the detection device 2 is illustrated in a state that an upper surface cover of a casing 6 of the detection device 2 is removed.

The electric conductivity detector 1 of this embodiment is constituted of the detection device 2 and a processing unit 4. The detection device 2 and the processing unit 4 are separately configured. The detection device 2 and the processing unit 4 are electrically connected to each other via a cable.

The detection device 2 includes a cell part constituted of a cell 14 in which liquid flows through and measurement electrodes 16 for applying a voltage across the cell 14, and a detection circuit board 18 (detection circuit) on which at least an analog circuit is mounted to apply a voltage between the measurement electrodes 16 and detect a current flowing between the measurement electrodes 16, the cell 14 and the detection circuit board 18 being accommodated in a common casing 6. A heat exchange block 11 is also accommodated in the casing 6. A heater 12 and a temperature sensor 13 are attached to the heat exchange block 11. Inside the heat exchange block 11, a flow passage leading to an inlet of the cell 14 is provided, and temperature regulation of liquid before being introduced into the cell 14 is sufficiently performed in the heat exchange block 11. A detection signal of the temperature sensor 13 is taken into the processing unit 4 through a communication cable, and an output of the heater 12 is controlled so that a temperature detected by the temperature sensor 13 becomes a preset temperature.

In addition, although the heater 12 and the temperature sensor 13 are electrically connected to the processing unit 4 through the detection circuit board 18 in this embodiment, the heater and the temperature sensor do not necessarily need to be connected through the detection circuit board 18.

As will be described later, the detection device 2 of this embodiment is accommodated in a column oven 28 (see FIG. 2) of an ion chromatograph. Since an inside of the column oven 28 is thermostatically controlled, a temperature of the detection device 2 accommodated in the column oven 28 also becomes stable. For this reason, the detection device 2 does not necessarily need to have the heater 12 and the temperature sensor 13 for performing temperature control independently. However, since the detection device 2 having a small heat capacity compared to the column oven 28 is independently provided with the heater 12 and the temperature sensor 13, finer temperature control than by the column oven 28 is possible, and a temperature of liquid flowing through the cell 14 and a temperature of the detection circuit 18 can be controlled with higher accuracy.

In addition, since the detection device 2 of this embodiment is independently provided with the heater 12 and the temperature sensor 13 and has a function of regulating an internal temperature independently, the detection device 2 does not necessarily need to be accommodated in the column oven 28.

The casing 6 of the detection device 2 is made of, for example, a thermally conductive material such as aluminum. Thus, when this detection device 2 is accommodated in the column oven 28 (see FIG. 2), heat in the column oven 28 can be sufficiently conducted to the heat exchange block 11, the cell 14, and the detection circuit board 18. An inlet pipe 8 and an outlet pipe 10 are drawn to an outside of the casing 6 and are configured in such a way that liquid flowing in through the inlet pipe 8 passes through the heat exchange block 11 and is introduced into the cell 14, and liquid having passed through the cell 14 flows out through the outlet pipe 10. The inlet pipe 8 and the outlet pipe 10 may be provided in advance, or may be connected from the outside.

The detection circuit board 18 accommodated in the detection device 2 is electrically connected to the processing unit 4 via communication cables. On the detection circuit board 18, there is mounted an analog circuit that applies a constant voltage between the measurement electrodes 16 and detects a current value flowing between the measurement electrodes 16. In a more preferred embodiment, an A/D conversion circuit that converts an analog signal from the analog circuit into a digital signal and outputs the digital signal to the processing unit 4 is also mounted on the detection circuit board 18.

The processing unit 4 is configured to perform various types of signal processing, such as taking in a signal output from the detection circuit board 18 of the detection device 2 and determining electric conductivity of liquid flowing through the cell 14 based on the signal. The processing unit 4 is implemented by a dedicated computer or a general-purpose personal computer.

In this embodiment, because the cell part constituted of the cell 14 and the measurement electrodes 16 and the detection circuit 18 are accommodated in the common casing 6 to form the integral detection device 2, the cell part and the detection circuit 18 can be handled as a single piece and can be easily disposed in the column oven 28 (see FIG. 2) of the ion chromatograph.

Next, an embodiment of an ion chromatograph using the above-described electric conductivity detector 1 will be described with reference to FIG. 2.

The ion chromatograph of this embodiment includes an analysis flow passage 20, a liquid sending device 22 that sends a mobile phase, a sample injection part 24 that injects a sample into the analysis flow passage 20, an analytical column 26 that is provided downstream of the sample injection part 24 on the analysis flow passage 20 and separates the sample by each component, a suppressor 30 that is provided downstream of the analytical column 26 on the analysis flow passage 20 and removes unnecessary ion components in the mobile phase having passed through the analytical column 26, and the above-described electric conductivity detector 1 that is provided downstream of the suppressor 30 on the analysis flow passage 20.

The analytical column 26 is accommodated in the column oven 28. Although illustration is omitted, the column oven 28 is internally provided with a heater and a temperature sensor, and an output of the heater is regulated so that the internal temperature becomes a set temperature.

The detection device 2 of the electric conductivity detector 1 is also accommodated in the column oven 28. Each of the inlet pipe 8 and the outlet pipe 10 of the detection device 2 of the electric conductivity detector 1 constitutes a part of the analysis flow passage 20 of this ion chromatograph. The inlet pipe 8 is drawn to an outside of the column oven 28 and connected to an outlet side of the suppressor 30. The outlet pipe 10 is drawn to the outside of the column oven 28 and connected to a drain.

The processing unit 4 of the electric conductivity detector 1 is disposed outside the column oven 28, and the detection circuit 18 of the detection device 2 accommodated in the column oven 28 and the processing unit 4 disposed outside the column oven 28 are electrically connected by a communication cable.

In the ion chromatograph of this embodiment, when a sample is injected by the sample injection part 24 into the analysis flow passage 20 through which the mobile phase from the liquid sending device 22 flows, the sample is guided to the analytical column 26 by the mobile phase. The sample introduced into the analytical column 26 is temporally separated by each component, and each component elutes from the analytical column 26 sequentially.

The mobile phase containing the sample component eluted from the analytical column 26 is subjected to removal of unnecessary ion components in the suppressor 30, and thereafter introduced into the cell 14 in a state of being regulated to a predetermined temperature in the heat exchange unit 11 (see FIG. 1). A constant voltage is applied across the cell 14, and a current according to concentration of components in the mobile phase flowing through the cell 14 flows between the measurement electrodes 16. The detection circuit 18 detects a current value of the current and outputs a signal based on the detected value to the processing unit 4. In the processing unit 4, electric conductivity of the liquid in the cell 14 is determined based on the signal from the detection circuit 18.

As described above, in the ion chromatograph of this embodiment, since the detection device 2 in which the cell part including the cell 14 and the measurement electrodes 16 and the detection circuit 18 are integrated is accommodated in the column oven 28, not only the temperature of the liquid flowing through the cell 14 but also the temperature of the detection circuit 18 can be maintained constant. Accordingly, even if fluctuations occur in the temperature of the surrounding environment (for example, room temperature), the liquid flowing through the cell 14 and the detection circuit 18 are not affected. Thus, the measurement of electric conductivity of the eluate from the analytical column 26 can be stably performed, and it is possible to suppress occurrence of drift of the detection signal due to temperature fluctuations.

Furthermore, in this embodiment, since the detection device 2 of the electric conductivity detector 1 is independently provided with the heater 12 and the temperature sensor 13 and can control the internal temperature with higher accuracy, the temperature of the liquid flowing through the cell 14 and the temperature of the detection circuit 18 can be further stabilized.

Furthermore, as a preferred embodiment, if an A/D conversion circuit that converts an analog signal from an analog circuit that measures the current value flowing between the measurement electrodes 16 into a digital signal is also mounted on the detection circuit 18, an output signal from the A/D conversion circuit is not affected by temperature fluctuations of the surrounding environment. Thus, occurrence of drift of the detection signal can be further suppressed, and reproducibility of measurement results can be further increased.

Figure 2:
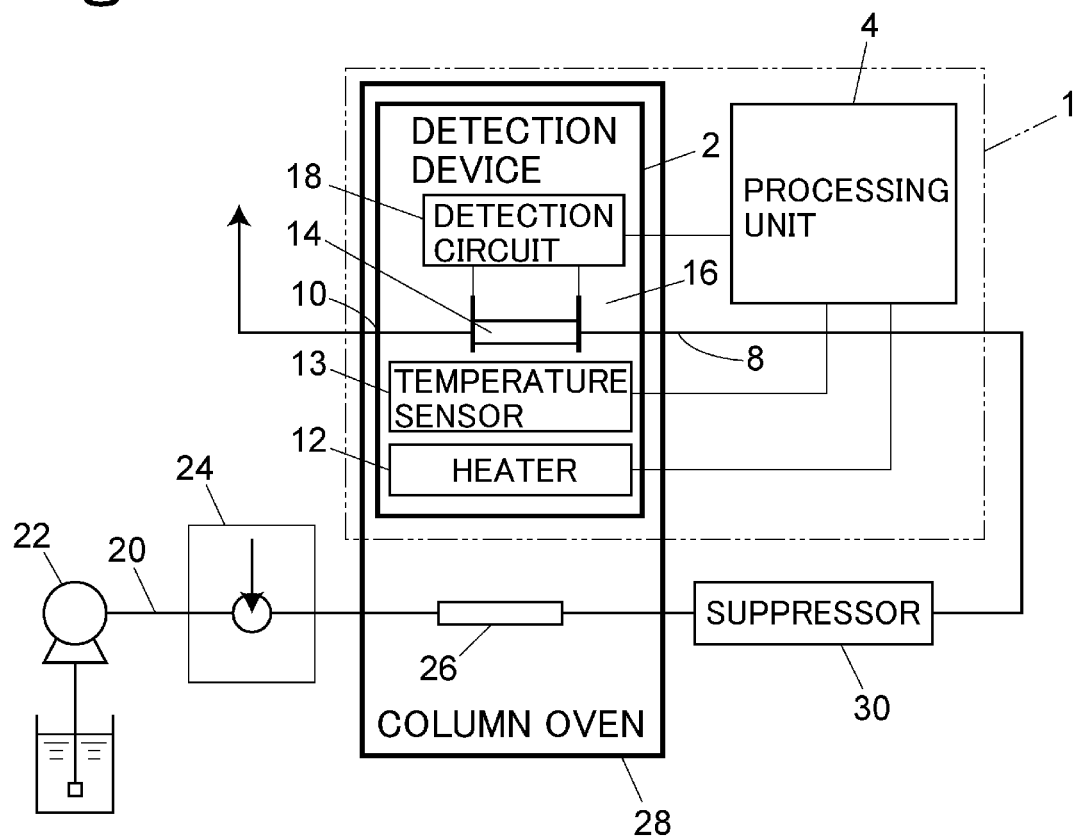
FIG. 2 is a flow passage configuration diagram schematically illustrating an embodiment of an ion chromatograph.

Although not illustrated in FIGS. 1 and 2, the electric conductivity detector 1 may be electrically connected to another arithmetic control unit. Such an arithmetic control unit may have a function of controlling operation of each element constituting the ion chromatograph, such as the liquid sending device 22, the sample injection device 24, and the column oven 28. Then, such an arithmetic control unit can be implemented by a dedicated computer or a general-purpose personal computer.

As already mentioned, a main object of the present invention is to stabilize a temperature of liquid flowing through the cell and a temperature of the detection circuit. Therefore, the present invention will suffice to include at least one of a configuration having the detection circuit accommodated in the column oven together with the cell part, and a configuration in which the detection device having the cell part and the detection circuit which are integrated independently includes a temperature control function. The above embodiments aim at synergetic effect that the accuracy of temperature control of the cell part and the detection circuit is further improved by providing both of these configurations, and the present invention is not limited to the aspects of the above embodiments.

The invention claimed is:

1. An electric conductivity detector comprising at least:
a cell part having a cell through which liquid flows therein and a pair of measurement electrodes measuring a current flowing through the liquid in the cell;
a detection circuit electrically connected to the measurement electrodes and configured to detect a current value flowing between the measurement electrodes, and to output a signal based on the detected value; and
a processing unit configured to take in a signal output from the detection circuit and perform signal processing, wherein
the cell part and the detection circuit are accommodated in a common casing to form an integral detection device, and the common casing containing the cell part and the detection circuit is accommodated in a column oven regulating a temperature of an analytical column of an ion chromatograph,
wherein the common casing is made of a thermally conductive material so that heat in the column oven can be sufficiently conducted to the cell part and the detection circuit, and
the detection device further comprises a heat exchange block disposed in the common casing, a flow passage leading to an inlet of the cell is provided inside the heat exchange block with a heater and a temperature sensor are attached to the heat exchange block, and a temperature of liquid before being introduced into the cell is regulated in the heat exchange block.

2. The electric conductivity detector according to claim 1, wherein the detection circuit includes at least an analog circuit for detecting a magnitude of a current flowing between the measurement electrodes.

3. The electric conductivity detector according to claim 2, wherein the detection circuit includes an A/D conversion circuit configured to convert an analog signal output from the analog circuit into a digital signal and to output the digital signal to the processing unit.

4. An ion chromatograph comprising:
an analysis flow passage;
a liquid sending device for sending a mobile phase in the analysis flow passage;
a sample injection part for injecting a sample into the analysis flow passage;
an analytical column for separating the sample injected by the sample injection part into individual components on a downstream of the sample injection part on the analysis flow passage;
the electric conductivity detector according to claim 1 for detecting ionic sample components separated by the analytical column by measuring the electric conductivity of an eluate from the analytical column on a downstream of the analytical column on the analysis flow passage; and
the column oven accommodating the analytical column therein and configured to regulate the temperature of the analytical column to a set temperature.

* * * * *